United States Patent
Nolte et al.

(10) Patent No.: US 12,449,358 B2
(45) Date of Patent: Oct. 21, 2025

(54) APPARATUSES AND METHODS FOR EXAMINING THE MOVEMENT OF CONSTITUENTS WITHIN TISSUE CELLS

(71) Applicant: PURDUE RESEARCH FOUNDATION, West Lafayette, IN (US)

(72) Inventors: David D. Nolte, Lafayette, IN (US); Kwan Jeong, Seoul (KR); Maria Josef Lopera, Medellin (CO); John J. Turek, West Lafayette, IN (US)

(73) Assignee: PURDUE RESEARCH FOUNDATION, West Lafayette, IN (US)

(*) Notice: Subject to any disclaimer, the term of this patent is extended or adjusted under 35 U.S.C. 154(b) by 348 days.

(21) Appl. No.: 18/036,360

(22) PCT Filed: Nov. 10, 2021

(86) PCT No.: PCT/US2021/072340
§ 371 (c)(1),
(2) Date: May 10, 2023

(87) PCT Pub. No.: WO2022/104347
PCT Pub. Date: May 19, 2022

(65) Prior Publication Data
US 2024/0011903 A1    Jan. 11, 2024

Related U.S. Application Data

(60) Provisional application No. 63/111,635, filed on Nov. 10, 2020.

(51) Int. Cl.
*A61B 5/00* (2006.01)
*G01J 3/02* (2006.01)
(Continued)

(52) U.S. Cl.
CPC .......... *G01N 21/474* (2013.01); *G01J 3/0208* (2013.01); *G01J 3/021* (2013.01); *G01J 9/02* (2013.01); *G01N 2015/1006* (2013.01)

(58) Field of Classification Search
CPC ............ G01N 15/1433; A61B 2503/42; A61B 2576/00; A61B 5/0077; A61B 5/0082;
(Continued)

(56) References Cited

U.S. PATENT DOCUMENTS

| | | | |
|---|---|---|---|
| 2009/0125242 A1* | 5/2009 | Choi | G01N 21/51 702/19 |
| 2017/0205615 A1* | 7/2017 | Vaziri | G02B 21/0072 |
| 2018/0136446 A1* | 5/2018 | Werley | G02B 21/16 |

* cited by examiner

*Primary Examiner* — Abdullahi Nur

(57) ABSTRACT

Apparatuses and methods for investigating the inside of a tissue cell are disclosed. Embodiments include diffusely scattering light off a target sample, producing two crossing beams from the scattered light, and using a camera to create an image from the light. Some embodiments utilize a Fourier lens and a Fresnel biprism, and optionally include a long-coherence light source, a delay plate (which can be a polarization rotator or an optical flat), and/or a beam expander. Still further embodiments utilize a diffraction grating, a spatial filter (which may include two differently sized apertures), and a Fourier lens, and optionally include differently sized apertures in the spatial filter. Some embodiments include a transparent support and illuminating the target at an oblique angle through the transparent support. Still further embodiments utilize a low-coherence light source and/or immobilizing the sample tissue using surface bonding chemistry.

28 Claims, 9 Drawing Sheets

(51) Int. Cl.
*G01J 9/02* (2006.01)
*G01N 21/47* (2006.01)
*G01N 15/10* (2006.01)

(58) Field of Classification Search
CPC ..... G03H 2001/005; G03H 2001/0445; G03H 2222/42; G03H 2222/45; G03H 1/0443; G03H 1/16; G01J 3/0229; G01J 3/10; G01J 3/1804; G01J 3/4531
See application file for complete search history.

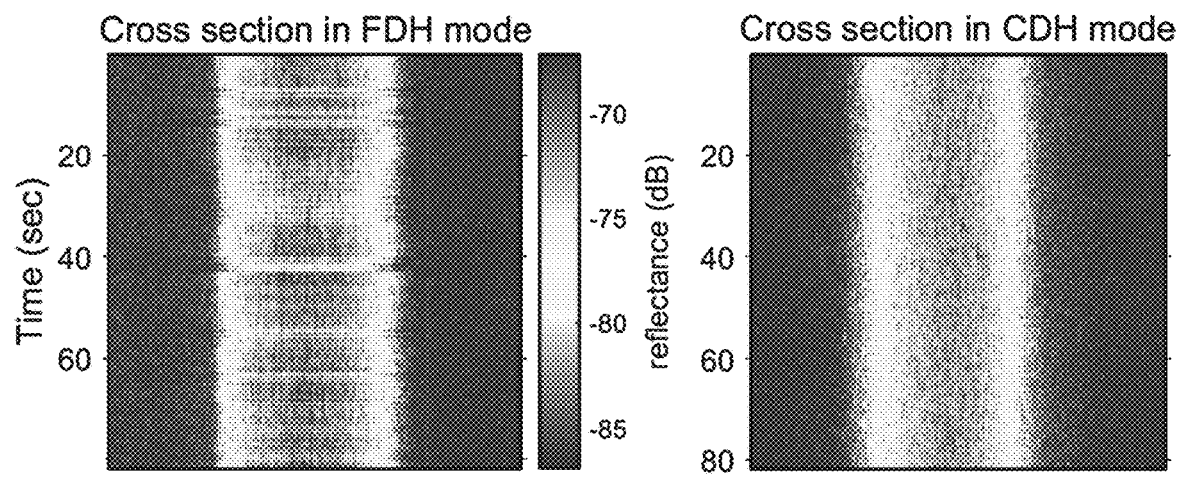
Fig. 3A
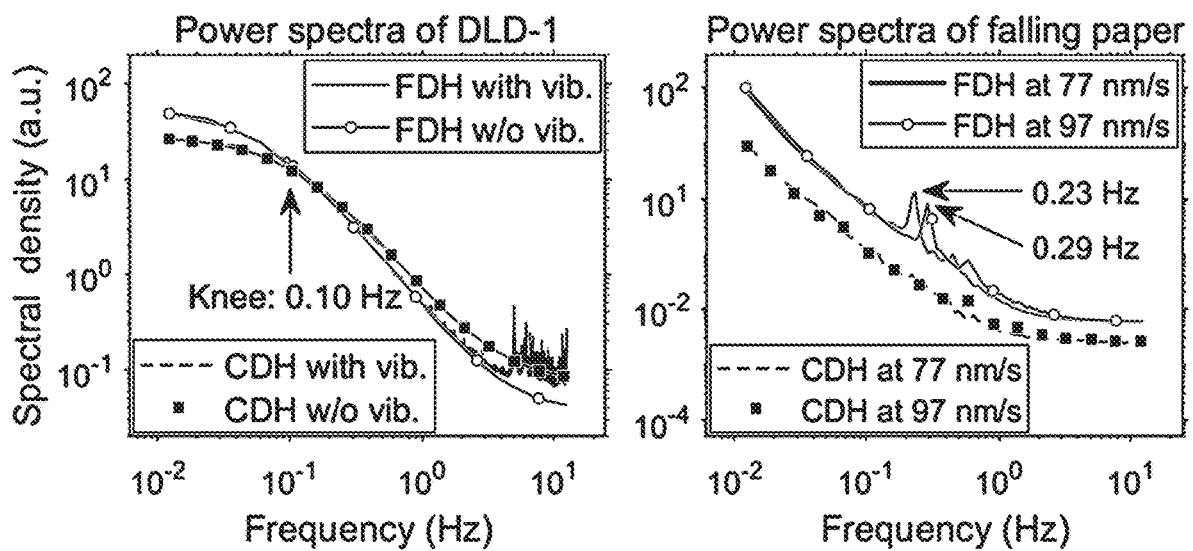
Fig. 3B
Fig. 3C

APPARATUSES AND METHODS FOR EXAMINING THE MOVEMENT OF CONSTITUENTS WITHIN TISSUE CELLS

This application is the National Stage of International Application No. PCT/US2021/072340, filed Nov. 10, 2021, which claims the benefit of U.S. Provisional Application No. 63/111,635, filed Nov. 10, 2020, the entireties of which are hereby incorporated herein by reference. Any disclaimers that may have occurred during the prosecution of the above-referenced application(s) are hereby expressly rescinded.

GOVERNMENT RIGHTS

This invention was made with government support under grant 1911357-CBET awarded by National Science Foundation. The government has certain rights in the invention.

FIELD

Embodiments of the present disclosure related to determining information concerning the constituents of tissue cells, including measuring dynamics within optically scattering or turbid materials and media.

BACKGROUND

Current systems for determining information concerning constituents of tissue cells, such as the motion of constituents of the tissue cells, include Fourier-domain digital holography (FDH). However, the inventors of the present disclosure realized that the motion sensitivity required for existing systems requires a high degree of mechanical stability of the sample in order that, for example, phase-sensitive measurements of Doppler frequency shifts can be made at least down to 10 mHz, which renders these systems difficult or impossible to use in places outside of an ideal lab environment. For example, the inventors realized that some of the current systems must be used on a ground floor of a building since the background vibrations of the building above ground floor can cause the system to work poorly or not work at all. The inventors of the present disclosure also realized that other systems that do not have extreme motion sensitivity were not applicable to volumetric imaging of tissue samples. Given these shortcomings in the existing methodologies, the inventors of the current disclosure realized that problems exist with systems and methods for determining information about the constituents, such as the motion of the constituents, of tissue cells and that improvements in these systems and methods are needed. Certain features of the present disclosure address these and other needs and provide other important advantages.

SUMMARY

The inventors of the present disclosure realized that common-path interferometers can have an advantage of producing ultra-stable interferometric fringes compared with conventional interferometers, such as Michelson or Mach-Zehnder, that are sensitive to environmental instabilities. Moreover, the inventors realized that isolating interferometric measurements from mechanical disturbances can be important in biodynamic imaging since Doppler spectroscopy of intracellular dynamics requires extreme stability for phase-sensitive interferometric detection to capture fluctuation frequencies down to 10 mHz.

Embodiments of the present disclosure include methods and apparatuses for biodynamic imaging of tissue, and methods and apparatuses that can simplify the biodynamic imaging process in consequential and non-trivial manners. In general, biodynamic imaging is a methodology for examining the motion of the constituents within a call, such as the movement of the mitochondria, the nucleus, and/or other intra-cellular organelles. Example embodiments of the present disclosure illuminate a group/ensemble of cells with electromagnetic radiation (for example, light) and statistically examine the Doppler spectra of the radiation reflected from the group of cells to examine the movement of the constituents within the cells in the group/ensemble. Being able to measure movement in a group of cells can be used, for example, to assist in determining which embryos in a group of embryos are more viable and better suited for invitro fertilization and to assist in the selection of chemotherapy for cancer patients.

Some embodiments of the present disclosure provide improved apparatuses and methods for examining information about the constituents within tissue cells, and some embodiments provide improved apparatuses and methods for determining information about the movement of constituents within tissue cells.

Additional embodiments of the present disclosure include common-path biodynamic imaging systems and methods using a grating and a spatial filter, and enable stable tissue dynamic spectroscopy (TDS) of thick biological tissue (for example, thick living tissue) that is useful for, for example, drug screening assays. At least one embodiment utilize a diffraction grating and/or a spatial aperture to generate a signal and a reference beam that share common pathways (which may be the same or similar optical pathways) through the optical system and interfere with one another at the camera plane.

Further embodiments include use of a Fresnel biprism for examining information about the constituents within tissue cells. Some embodiments can use both short coherence light (light that may be coherent for a very short distance, such as on the order of tens of microns (or wavelengths) or less, and also referred to as low coherence light) and long coherence light (light that is coherent for longer distances, such as on the order of hundreds of microns (or wavelengths) or more, and also referred to as high coherence light) as the light source. Additional embodiments utilizes a Fresnel biprism and creates signal and references waves that interfere at the camera plane.

Yet further embodiments include common-path biodynamic imaging system using a Fresnel biprism and generate fringes that modulate the dynamic speckle caused by light scattering from a dynamic target.

Still further embodiments of the present disclosure include a common-path interferometer using a holographic diffraction grating and a spatial filter employed with a low-coherence source.

Still further embodiments include common-path interferometers using a grating and spatial filters to provide enhanced interferometric stability in tissue-dynamics spectroscopy for, as an example, drug screening assays.

Additional embodiments utilize a Fresnel biprism and create two crossing beams to generate the digital hologram. Additional delay elements may be incorporated into the optical configuration enable depth selectivity.

Yet additional embodiments of the present disclosure demonstrate enhanced interferometric stability against mechanical vibrations through common-mode rejection while maintaining sensitivity to Doppler frequency fluctuations caused by intracellular motions.

Embodiments of the present disclosure use low-coherence light that has been scattered from a three-dimensional target (also referred to as a volumetric target) to produce information about the movements of the constituent parts within the depths of the target by, for example, limiting which portions of the light can interfere with one another. The methodologies used in some embodiments may be visualized as each coordinate on the surface of the target being represented by a stack of data from different depths below that surface coordinate (also referred to as a stack of coherence-gated optical sections that are summed together) and can be referred to as a "compressed flythrough" type methodology. Embodiments may not produce high-fidelity images per se, but instead may produce statistical information (for example, maps of statistical information) about the movements of the constituents within the three-dimensional target.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 3A are depictions comparing the amplitude of reflection in dB along one spatial dimension as a function of time for a DLD-1 living tumor spheroid cross section using conventional biodynamic FDH (left diagram) and one embodiment of the present disclosure (CDH—right diagram) while applying external vibrations to the target sample.

FIG. 3B is a depiction of the power spectra corresponding to FIG. 3A comparing results with the system being externally vibrated and without the system being externally vibrated.

FIG. 3C is a depiction of the power spectra of slowly falling paper comparing results with the system being externally vibrated and without the system being externally vibrated.

DETAILED DESCRIPTION OF THE ILLUSTRATED EMBODIMENTS

Figure 1:
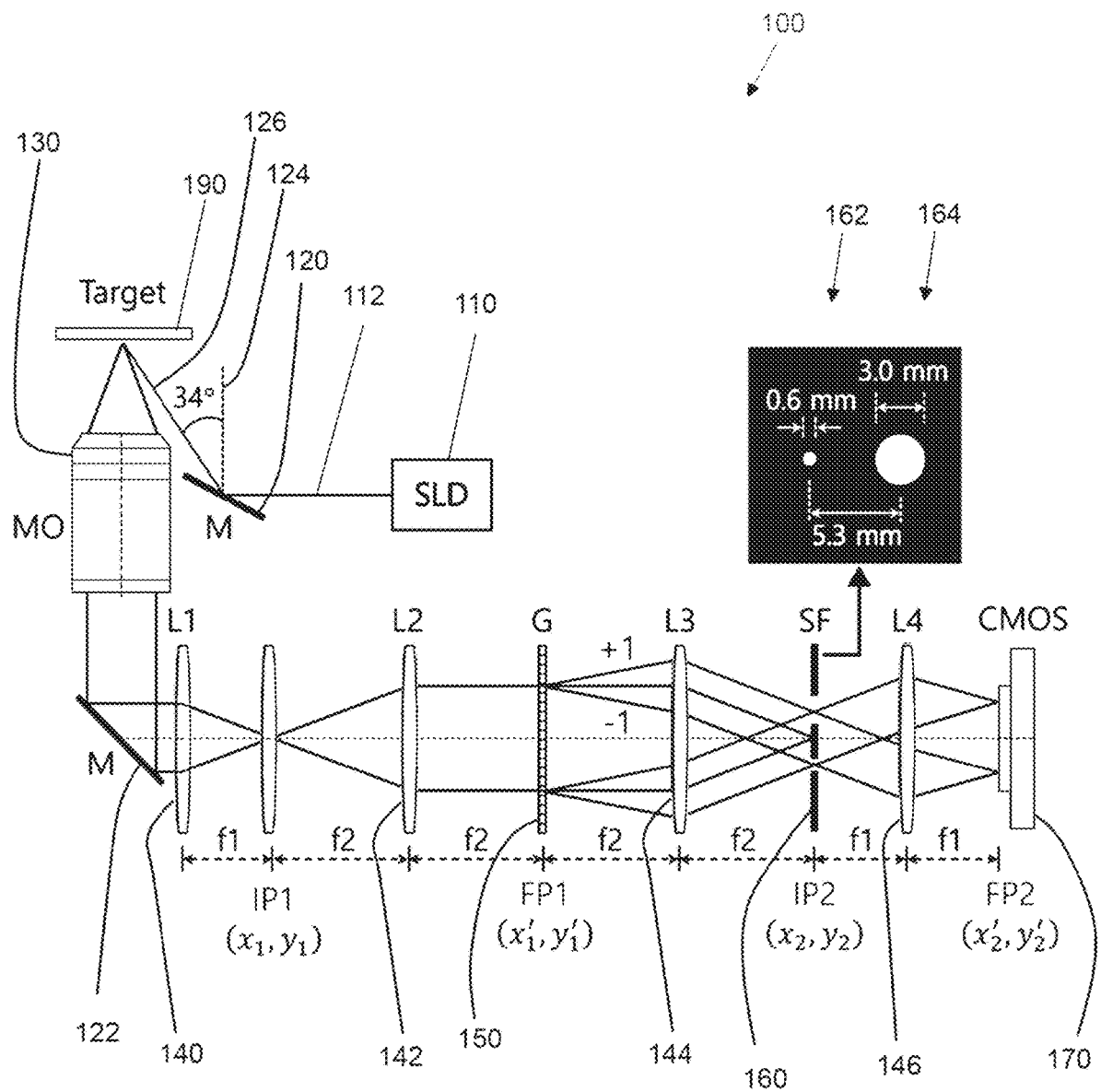
FIG. 1 is a schematic diagram of a common-path digital holography system according to at least one embodiment of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

As used herein, low-coherence light refers to light that may be coherent for a very short distance, such as on the order of tens of microns (or wavelengths) or less. Low coherence light is typically produced by light emitting diodes (LEDs) and superluminescent diodes (SLDs). Lasers typically produce light that has a high amount of coherence, and are typically not low-coherence light sources.

Depicted in FIG. 1 is a common-path interferometer with reflective mode operation 100 (which may also be referred to as a diffraction grating tissue dynamic spectroscopy system) according to one embodiment of the present disclosure. The interferometer 100 includes a light source 110 (for example, a superluminescent diode), a mirror 120, a microscope objective lens 130, one or more lenses (for example, 140, 142, 144 and 146), a diffraction grating 150, a spatial filter 160, and an imaging device 170 (for example, a camera such as CMOS camera). The diffraction grating 150 is located at a Fourier Plane (FP1), the imaging device 170 is located at another Fourier Plane (FP2), and the spatial filter 160 is located at an image plane (IP2). The various components are arranged using combinations of focal lengths f1 and f2 as depicted in FIG. 1. In at least one example embodiment, f1=10 cm and f2=15 cm. In one example embodiment, the superluminescent diode 100 includes a center wavelength at 840 nm and a short coherence length of 10 μm, such as a Superlum® S840-B-I-20 superluminescent diode.

Due to the arrangement of the components, the probe beam 112 from the light source 110 is directed toward the target 190 and illuminates the target 190 at an oblique angle (for example, an oblique angle of 34°) relative to the backscatter direction 124. The intracellular transport is isotropic relative to the direction of the incoming wave vector 126. Although the average Doppler frequency shift is zero, the Doppler frequency shifts in the scattered light produce temporal fluctuations that are described in a Doppler fluctuation spectrum. Such spectrum typically has a characteristic frequency related to the average speed of motion of cellular constituents and has additional other spectral features that can be related to the properties and the health of the target. The maximum likely frequency component (typically referred to as the knee frequency) of the fluctuation spectrum from the light reflected off the target 190 represents the maximum Doppler frequency shift within the ensemble of scatterers present in the target 190, and the maximum is at the backscattering angle of 180°. With the light illuminating the target 190 being slightly angled, the requirement for a beam splitter is eliminated and the intensity of the light collected by microscope objective lens 130 is increased.

The microscope objective lens 130 collects the light scattered from the target 190. In one example embodiment the microscope objective lens 130 is a 10× microscope objective lens with a long working distance of 30.5 mm and a numerical aperture of 0.26. After leaving the microscope objective lens 130 the light may be reflected off a mirror 122, which can help reduce the overall height of the common-path interferometer 100.

The light leaving the microscope objective lens 130 may then be magnified using lenses. For example, the light leaving the microscope objective lens 130 may pass through lens 140 and lens 142, which may magnify the light at a ratio of, for example, 3:2.

The light then encounters the diffraction grating 150, which may be a holographic transmission grating and which may be positioned at the first Fourier plane (FP1). The diffraction grating 150 splits the light into identical +1 and −1 diffraction orders with high efficiency. In one embodiment the phase grating (HOLO/OR LTD) of the diffraction grating 150 has a 73% transmission efficiency (with a partially quenched zero-order) and a beam separation angle of 2.01°. The use of a high-efficiency holographic diffraction grating enables embodiments of the current disclosure to use light diffusely scattered from the biological or turbid target as a reference, in contrast to relying on the high intensity of specular reflections and low-efficiency diffraction gratings to form the reference.

The light leaving the diffraction grating 150 is then transformed by another lens (for example, lens 144) to a second image plane (IP2) where the spatial filter 160 is located. The spatial filter 160 is configured to allow only the first diffraction orders of the light to pass through a spatial filter 160. The other diffraction orders are blocked by the spatial filter. In at least one embodiment the spatial filter 160 includes a small reference aperture 162 (for example, an aperture with a 0.6 mm diameter) and a large object aperture 164 (for example, an aperture with a 3.0 mm diameter). The two apertures 162 and 164 are separated laterally. In some embodiments the distance between the edges of the adjacent apertures nearest to one another (in other words, the distance of opaque material between the edges of the two apertures) is selected to produce interference gratings greater than the minimum fringe spacing allowed for the image detector being used. The minimum fringe spacing can be calculated assuming there are three (3) fringes across a speckle, and three (3) pixels across a fringe, resulting in nine (9) pixels across a speckle. For the cameras used in embodiments of the present disclosure, the lateral separation between the two apertures 162 and 164 is approximately 5.3 mm. The light passing through the large object aperture 164 (the +1 diffractive order light) produces an object wave while light passing through the small reference aperture 162 (the −1 diffraction order light) produces a reference wave. In some embodiments, the target 190 location is shifted slightly in the horizontal plane until at least one bright speckle is observed in the small aperture 162, which helps to ensure that the small aperture provides sufficient intensity in the reference beam that crosses the object beam at the imaging device 170 and to help optimize performance Lens 146 may be a Fourier lens, which can perform an optical Fourier transform on the light. After the Fourier transform is performed, the reference and object waves share the same path and create stable interference fringes at the second Fourier plane (FP2), where the imaging device 170 is located. The imaging device 170 records the light pattern, which may be in the form of a hologram. In one example, the imaging device 170 (for example, a CMOS camera, such as the Basler ° acA1920-155 um) records a hologram with a size of 800 by 800 pixels and a 12-bit depth at 25 frames per second and an exposure time of 10 msec per frame.

The scattered wave field magnified by the microscope objective 130 and the lens 140 is denoted as $U(x_1, y_1)$ at the image plane IP1. For an ideal binary phase grating with a duty cycle of 0.5 and a π-phase depth, the transmission function of the grating is given by $$g(x_1', y_1') = \sum_{m=-\infty}^{+\infty} \frac{\sin(m\pi/2)}{m\pi/2} \exp\left[j\frac{2\pi m x_1'}{\Lambda}\right], \quad \text{(Equation 1)}$$

where m is the diffraction order and Λ is the period of the grating. The diffraction efficiency vanishes for all even values of m, and has a maximum of about 40.5% for each of the +1 and −1 orders. In the 4f imaging system of the lenses 142 and 144, the wave $U_a(x_2, y_2)$ after the spatial filter at IP2 is given by $$U_a(x_2,y_2) \approx U(-x_2+x_0,-y_2)\text{circ}[r_+'/R_o]+U(-x_2-x_0,-y_2)\text{circ}[r_-'/R_r], \quad \text{(Equation 2)}$$

where $x_0 = \lambda f_2/\Lambda$, λ is the wavelength, $r_+' = \sqrt{(x_2-x_0)^2+y_2^2}$, $r_-' = \sqrt{(x_2+x_0)^2+y_2^2}$, and $R_o$ and $R_r$ are the radii of the large object aperture 164 and small reference aperture 162, which are centered at $+x_0$ and $-x_0$ in the x-direction from the center, respectively.

The last lens 146 performs a Fourier transform, and the reference wave $U_r(x_2', y_2')$ and object wave $U_o(x_2', y_2')$ at the camera plane FP2 can be expressed as $$U_o(x_2', y_2') \approx \exp\left(j\frac{2\pi x_0 x_2'}{\lambda f_1}\right) FT[U] \otimes J_{inc}\left(\frac{R_o \rho'}{\lambda f_1}\right), \quad \text{(Equation 3)}$$

$$U_r(x_2', y_2') \approx \exp\left(-j\frac{2\pi x_0 x_2'}{\lambda f_1}\right) FT[U] \otimes J_{inc}\left(\frac{R_r \rho'}{\lambda f_1}\right), \quad \text{(Equation 4)}$$

where FT[U] is the Fourier transform of U, $J_{inc}(x) = J_1(x)/x$ in which $J_1(x)$ is a Bessel function of the first kind, ⊗ denotes convolution, and $\rho' = \sqrt{(x_2')^2+(y_2')^2}$. The reconstruction of the hologram is performed by an inverse Fourier transform and consists of a zero-order term and two conjugate diffraction terms. One diffraction term is reconstructed at $(2x_0, 0)$ as $$FT^{-1}\left\{\exp\left(j\frac{4\pi x_0 x_2'}{\lambda f_1}\right)\left\{FT\left[U\left(\frac{-x_2'}{\lambda f_1}, \frac{-y_2'}{\lambda f_1}\right)\right] \otimes J_{inc}\left(\frac{R_r \rho'}{\lambda f_1}\right)\right\}^* \right. \quad \text{(Equation 5)}$$
$$\left. \left\{FT\left[U\left(\frac{-x_2'}{\lambda f_1}, \frac{-y_2'}{\lambda f_1}\right)\right] \otimes J_{inc}\left(\frac{R_o \rho'}{\lambda f_1}\right)\right\}\right\}.$$

The resolution and phase sensitivity of the reconstructed image for the interferometer 100 is calculated for the common-path digital holography (CDH) and is determined by the reference-wave term of $FT[U] \otimes J_{inc}(R_r\rho'/\lambda f_1)$ in Equation 4. On the other hand, in Fourier-domain digital holography (FDH) this term is replaced by the plane reference wave and the quality of the reconstructed image is mainly determined by the object wave FT [U]. Therefore, the spatial resolution in FDH may be higher than that for CDH.

Because interferometry has such high sensitivity to displacements down to hundreds of nanometers, the mechanical stability of the living sample in the plate is essential for conventional FDH. The common path systems described herein have significantly less sensitivity to sample displacement than conventional FDH systems, but in some embodiments it is very helpful, and sometimes necessary, to have the sample immobilized so that it does not shift significantly during the time of the image recording by the camera. In order to achieve sample immobilization, embodiments of the present disclosure immobilize samples in a 1% low-gel-temperature agarose in the RPMI-1640 basal medium. Immobilized samples can then be overlaid with RPMI-1640 containing 10% heat-inactivated fetal calf serum (Atlanta Biologicals), penicillin (100 IU), and/or streptomycin (100 μg/mL). In some embodiments samples are immobilized without agar, such as by attaching the sample to a non-toxic surface chemistry based on poly-D-lysine coating the bottom of a sample plate.

Figure 2A:
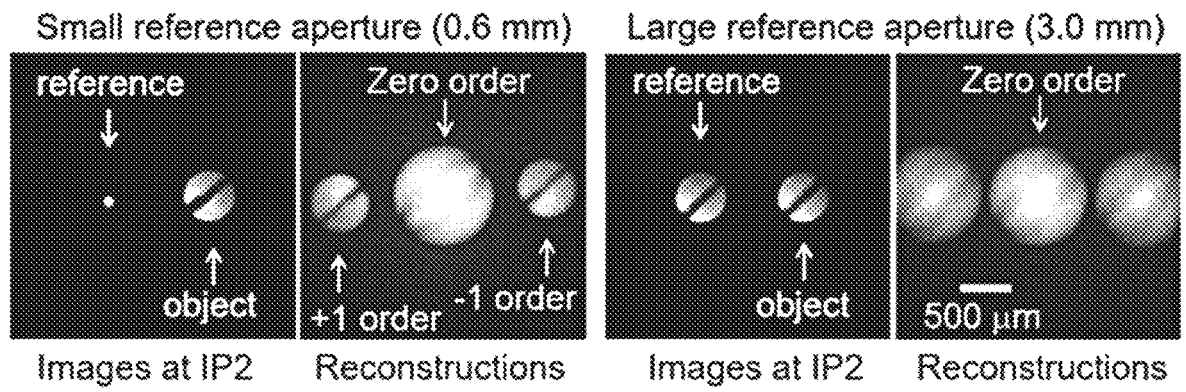
FIG. 2A is a depiction of images for the small reference aperture and the large object aperture at the IP2 image plane and their reconstructed images, and where the reference aperture has the same size as the object aperture and their reconstructed images.

FIG. 2A depicts an example of target image reconstructions using CDH. The digital holograms were recorded at the camera plane and were numerically transformed using a two-dimensional fast Fourier transform (FFT). The target 190 is matte white paper with a narrow rectangular cutout (slit) oriented at an oblique angle with respect to the paper. The figure shows images of the reference and object beams for the two types of apertures at the image plane IP2 (small reference aperture 162 and large object aperture 164) and their reconstructed images are shown after the FFT. As specified by Equation 5, the first-order image when using the small reference aperture 162 (for example, with a diameter of 0.6 mm) is similar to the target image at IP2, whereas the first-order image for the object aperture 164 is the autocorrelation of the object, stated differently, it is not the image itself but the image autocorrelated with itself. Therefore, in at least one embodiment the size of the reference aperture is optimized for biodynamic imaging, such as by measuring the modulation transfer function and the image brightness and finding a compromise where both are acceptable, which can maximize the throughput while maintaining acceptable resolution for biodynamic imaging applications.

Figure 2B:
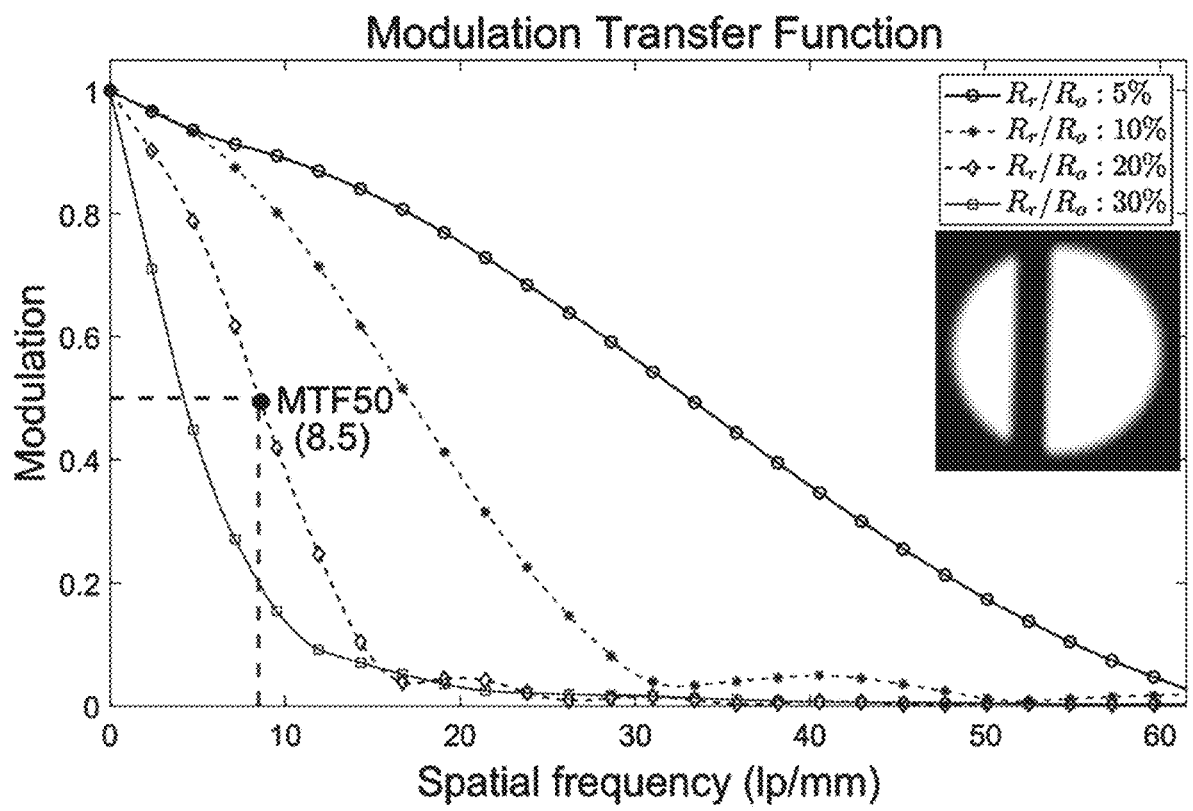
FIG. 2B is a depiction of the modulation transfer function for four different ratios of $R_r/R_o$ to estimate the resolution of the embodiment depicted in FIGS. 1 and 2, with the inset being a depiction of the simulated reconstruction of a slanted-edge phase target with a 7-phase depth for $R_r/R_o=20\%$.

In some embodiments, Equation 5 is used to estimate the optimal size of the reference aperture, such as by measuring the modulation transfer function (MTF) of the imaging system, which is defined as the output modulation ($M_o$) divided by the input modulation ($M_i$) as a function of spatial frequency. Simulations can be performed using a vertical knife-edge phase target with a 7-phase depth and a tilt angle of 2 degrees as the object image for the simulation, and the MTFs can be evaluated from the Fourier transform of the line spread functions using the reconstructed images obtained by varying the ratio $R_r/R_o$ from 0.01 to 0.4, as shown in FIG. 2B.

In these embodiments, the reconstructed image for the large reference aperture 164 (100% size ratio) is the autocorrelation of the object image and has no phase information. However, a reference aperture with a smaller diameter at the image plane IP2, such as small reference aperture 162, can act like a pin hole and makes the reference wave at the FP2 more similar to a plane wave and increasing the spatial resolution, as shown in the graph in FIG. 2B. However, reference apertures with diameters that are too small will limit the optical fluence at FP2, which will decrease the signal-to-noise ratio and sensitivity in biodynamic imaging. As such, in some embodiments relatively good performance is achieved using a small reference aperture 162 with a 20% ratio relative to the size of the large object aperture 164. Using this configuration, the spatial resolution is estimated to be 8.5 line pairs per mm (lp/mm) in FIG. 2B. A smaller reference aperture can be used to increase the resolution and phase sensitivity if a source with a higher power or a camera with a higher sensitivity is used. In embodiments where the small reference aperture 162 has a size ration of 5% or 10% relative to the large object aperture 164, the resolution in FIG. 2B can reach 33 lp/mm or 17 lp/mm, respectively.

In at least one experiment utilizing embodiments of interferometer 100, living DLD-1 (human colon adenocarcinoma) spheroids were used as a target 190 tissue sample. Tumor spheroids were cultured in a rotating bioreactor for 7-14 days until 300-600 μm diameter spheroids were formed, and then immobilized with low-gel-temperature agarose in a 96-well plate. To investigate stability against external vibrations, biodynamic imaging of fresh tumor spheroids was performed in both the CDH and FDH modes with and without external vibrations. External vibrations were generated by driving a motor with adjustable coupling to the optical table holding supporting the optical system 100. The speed of the motor was increased until it noticeably affected the interference fringes observed in the hologram, which in one experiment occurred at about 6000 rpm. Holograms were recorded for 82 seconds at a frame rate of 25 frames per second while imaging a fresh tumor spheroid of about 300 μm diameter. Cross-sections (lateral position versus time) in FDH and CDH modes with external vibrations were measured, and are shown in FIG. 3A. In the cross-section of FDH in the conventional Mach-Zehnder configuration, the total intensity fluctuated over time, whereas in the interferometer 100 system the intensity at each pixel fluctuated over time due only to intracellular motility (and not due to table vibrations) and the total intensity was stable. Using this experiment, it was demonstrated that the interferometer 100 system was more stable to external vibrations and more sensitive to biological movements than the non-common-path FDH system.

Depicted in FIG. 3A are line plots showing the amplitude of reflection in dB along one spatial dimension (the horizontal axis) as a function of time (vertical axis) for both an FDH system (left diagram) and the CDH interferometer 100 (right diagram).

Fluctuation power spectra may be acquired by performing temporal FFTs of the time series of multiple image reconstructions performed at the frame rates as shown in FIG. 3B. The two line plots without markers are the power spectra for two systems (FDH and interferometer 100 (CDH)), and the two plots with markers are the power spectra for the two systems with no vibration. It can be seen that the system utilizing interferometer 100 (CDH) is more stable to external vibration than the FDH system.

To compare the effects of external vibrations in another (quantitative) manner, the relative deviation at a frequency was defined as the absolute difference between the value of the spectral density with and without vibration divided by the value of the spectral density with no vibration. The averages of relative deviations in three bands (lower than 0.1 Hz, between 0.1 Hz and 1 Hz, higher than 1 Hz) using a high-frequency vibration source were measured to be 4.6%, 3.1%, and 80% respectively for FDH, whereas for the interferometer 100 the averages in the three bands were measured to be 1.8%, 2.5%, and 2.4%, respectively. The power spectrum in FDH also had considerable noise, especially in the high frequency band, while the power spectrum for interferometer 100 was relatively smooth for all frequency bands. These curves show the typical spectrum shape from living tissue, with a knee at low frequency (0.1 Hz), a power-law roll-off at intermediate frequency, and a floor near the Nyquist frequency (at high frequency). To simulate low-frequency noise, a slowly falling paper target (which was a piece of paper floating on the surface of a water-filled well while the water evaporated) was used as a slow phase modulation source. As shown in FIG. 3C, the FDH power spectra show peaks at Hz and 0.29 Hz for two different paper speeds, but no peaks for the interferometer 100 (CDH). Using this information, it can be seen that interferometer 100 (CDH) demonstrates a general insensitivity to global phase drift because of common-mode rejection, which is at least one reason why interferometer 100 (CDH) appears to be stable against external mechanical disturbances.

Figure 3D:
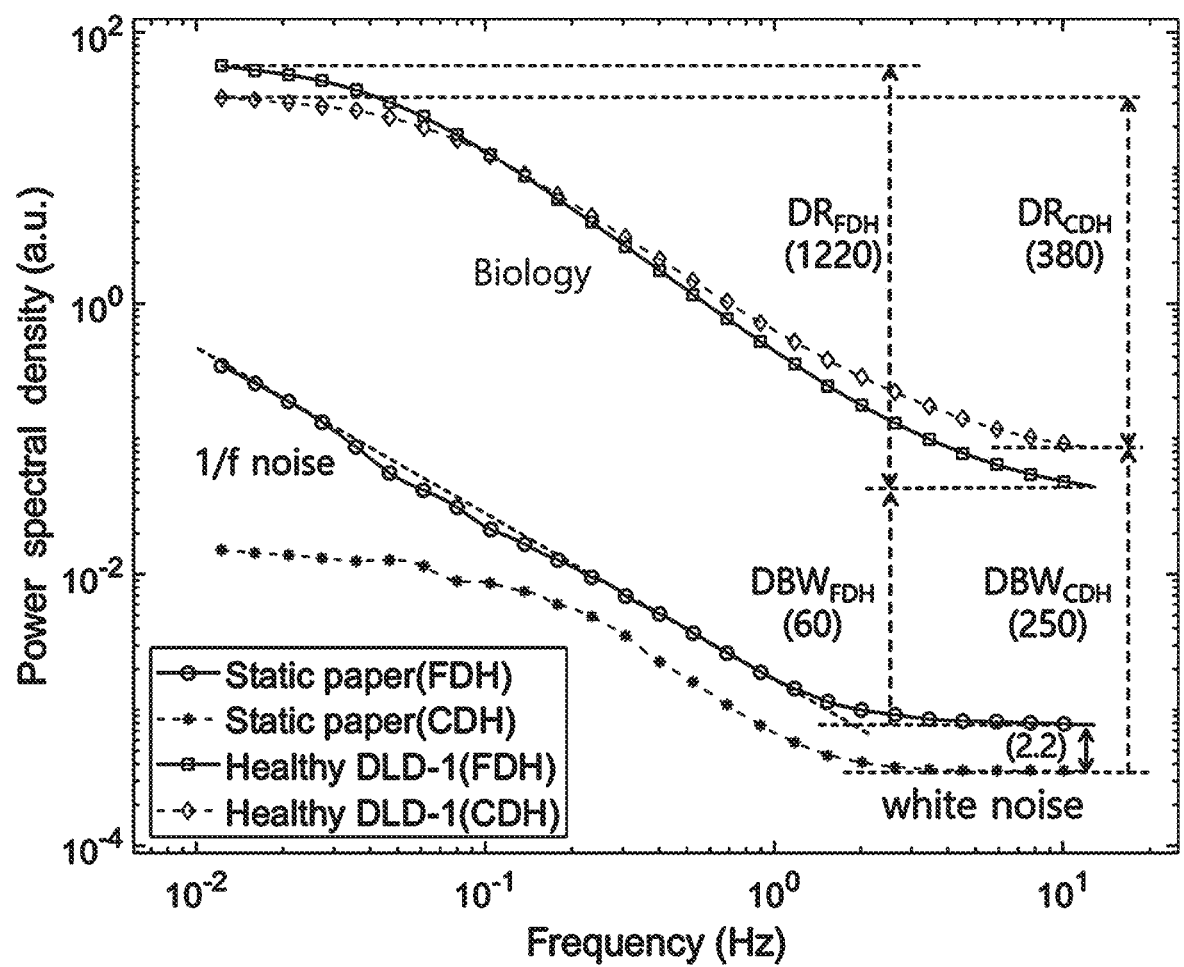
FIG. 3D is a comparison of the power spectra of a dynamic sample (DLD-1) and static sample (white paper) using conventional biodynamic FDH and using an embodiment of the present disclosure depicted in FIG. 1 (CDH).

FIG. 3D compares the power spectrum of a dynamic DLD-1 spheroid with the power spectrum of static white paper utilizing FDH and interferometer 100 (CDH) at roughly the same backscatter brightness. Compared to the spectral density of static paper, the white noise in FDH is 2.2 times higher than that in interferometer 100 (CDH), which appears to be due to the difference in stability against external vibrations. The detection bandwidth (DBW) in interferometer 100 (CDH) is 4.2 times higher than that in the FDH system, whereas the dynamic range (DR) of biological samples in FDH is 3.2 times higher than that in interferometer 100 (CDH) due to the more efficient photon collection in FDH. Therefore, the interferometer 100 (CDH) system appears to be insensitive to global phase drift while remaining sensitive to speckle-scale phase fluctuations caused by interfering Doppler frequency shifts from intracellular motions.

Figure 4:
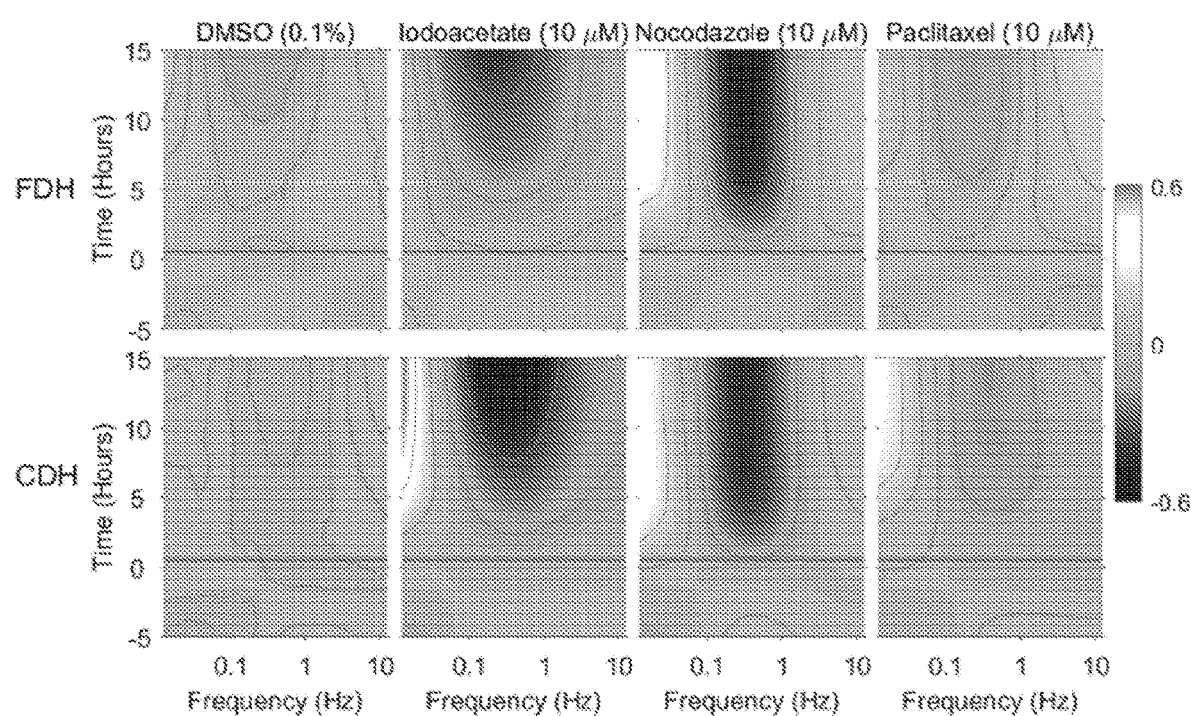
FIG. 4 contains graphical depictions of average spectrograms for responses to applied drugs for both conventional FDH and an embodiments of the present disclosure depicted in FIG. 1 (CDH), both without vibrations.

To investigate whether the interferometer 100 (CDH) system is an effective modality for tissue-dynamics spectroscopy, tissue-response spectrograms tracking time changes in intracellular dynamics in response to drug perturbations were acquired in both FDH and interferometer 100 (CDH) modes as shown in FIG. 4. In making this comparison, the FDH system was operated with maximum vibration isolation to achieve the highest stability relative to interferometer 100 (CDH). Spectrograms were generated from spectral changes relative to the average baseline spectrum in fluctuation power spectra as a function of time. After 6 measurements of pre-dose baselines, post-dose responses captured the signatures caused by the treatment and were measured 15 times every hour. Cytoskeletal (nocodazole and paclitaxel) and metabolic (iodoacetate) drugs were used, and a medium containing 0.1% carrier dimethyl sulfoxide (DMSO) (for drug solubility) was used as a negative control. Nocodazole disrupts microtubules by inhibiting the polymerization of microtubules, whereas paclitaxel stabilizes microtubules by preventing depolymerization. Iodoacetate inhibits the glycolysis that contributes to the rapid growth of cancer cells through the supply of ATP.

Spectrograms for the negative control in FDH and interferometer 100 (CDH) systems showed relatively small responses that are typically seen in continuously proliferating tissue samples, with minor changes over time. The average spectrograms in response to iodoacetate utilizing the FDH system indicated an overall inhibition of cellular activity. Using interferometer 100 (CDH), the tissue-response was close to that of the FDH system except for the stronger red shift in interferometer 100 (CDH) at low frequencies. The response to nocodazole showed enhanced low and high frequencies and suppression at mid frequencies with minor differences between the FDH and interferometer 100 (CDH). The response to paclitaxel closely matched that of nocodazole, except for a somewhat weaker response. Therefore, the tissue responses to drugs appeared to be functionally equivalent between the interferometer 100 (CDH) and FDH, while the interferometer 100 (CDH) system had the added advantage of stability against environmental influences and may have more flexibility than the FDH system in point-of-care applications despite its lower resolution.

FIG. 4 depicts the average spectrograms (3 replicates) reflecting the drug-responses to 0.1% DMSO, iodoacetate, nocodazole, and paclitaxel in using FDH and an embodiment of the present disclosure (CDH). The drug was applied at t=0. As can be seed by the spectrograms, the performance of the embodiment of the present disclosure (CDH) is functionally equivalent to the performance of FDH.

Achieving enhanced interferometric stability using a common-path holography configuration can result in some performance trade-offs on biodynamic performance. For example, when utilizing a common-path system tradeoffs can occur between spatial resolution and holographic fringe contrast on the camera. When imaging tumor spheroids for example, nominal performance can be achieved by limiting the reference aperture to 20% of the image aperture, which can limit the imaging resolution to approximately 100 microns. Although this resolution may be insufficient to image certain individual cells in the tumor, it is nevertheless compatible with the tissue dynamics spectroscopic imaging (TDSI) mode of biodynamic imaging that produces spatial maps of intracellular dynamics across the tumor. Other tradeoffs that can occur include the loss of independent z-control for depth ranging. On the other hand, a low-coherence light source can produce a condition of self-coherence-gating that selectively interferes light that shares the same optical path length, which can create a "compressed flythrough" that superposes successive coherence-gated holograms, at increasing depth, onto the digital camera. When the Doppler spectra are averaged over all depths of the target and weighted by a decreasing exponential function that decays with the reduced extinction coefficient μ', this can selectively weight the Doppler information to a depth inside the target (for example, a depth of approximately 200 microns inside the target) with the lateral spatial resolution of, for example, 100 microns as discussed above. Biodynamic imaging into thick samples with moderate amounts of multiple scattering can increase dynamic sensitivity since, for example, Doppler frequency shifts can accumulate with each scattering event and increases the sensitivity to intracellular motions. Therefore, the 20-micron voxel size of conventional biodynamic imaging can be traded for approximately a 100-micron voxel size in common-path system according to embodiments of the present disclosure while gaining superior mechanical stability and maintaining full spectral dynamic range for tissue dynamics applications.

An alternate embodiment of the interferometer 100 depicted in FIG. 1 includes a delay plate placed in the path of one of the apertures (reference aperture 162 or object aperture 164) in the opaque spatial filter 160 located at the image plane IP2. This delay plate can be an optical flat that produces a path delay given by (n−1)d, where n is the refractive index of the plate and d is the thickness of the plate. A typical value for this delay is 100 microns to 300 microns.

The optical plate alone may sometimes be too thin to provide this small delay, and therefore in alternate embodiments two optical flats are used, and a small thickness difference may be selected to give 100 microns to 300 microns differential delay. These embodiments produce a delay between the signal and the reference beams. If the delay is designed to be a fraction of the sample thickness, then it can produce interference from photons scattered from different depths inside the volumetric translucent target. If the light source is a low-coherence source (for example, a superluminescent diode) then each depth references the other, and it produces an effective depth gate set by the thickness of the delay plate. Embodiments where both the delay plate and the low-coherence source are used together can work particularly well.

In still further alternate embodiments of interferometer 100 depicted in FIG. 1, a long-coherence source is used while still providing depth selection using a wave plate that is a polarization rotator rotating the polarization by more than 45° and up to 90°. Polarizations rotated by 90° tend to not produce interference fringes and tend to be ill suited for digital holography. However, in the embodiments of interferometer 100 described above the target is living tissue (for example, a tumor biopsy, a tissue structure grown in a bioreactor, or other living targets such as an embryo), which tend to be volumetric highly-scattering translucent samples. Multiple light scattering occurs in these samples and randomly rotates the polarization of the photons that are scattered from depths exceeding about 100 microns into the tissue. Here, crossed-polarization between the signal and reference beams interferes with photons coming from different depths from inside the target sample, which effectively creates a coherence gate located between 100 to 300 microns inside the tissue sample. This depth selectivity can be important for biodynamic imaging because it can exceed the transport length of oxygen in living tissue and allow selective imaging of the hypoxic regions of living samples, which is valuable in the development of anticancer drugs. Embodiments utilizing these systems and methods yield coherence gating even when used with a long-coherence light source since they allow interference even for the optical path difference between the deep and shallow photons. This operation is contrary to the common knowledge in optical coherence tomography (OCT) in which depth gating occurs only with low-coherence sources. Moreover, utilizing the aforementioned embodiments it is possible to retain the low-coherence source with the polarization rotation since, for example, the randomly rotated photons for both the signal and reference arms can originate from depths between 100 microns and 300 microns and still interfere. In embodiments that can be converted or switched between the low-coherence and the high-coherence sources, the depth selectivity can be changed by merely changing the light source and without changing any other aspect of the apparatus or method.

Figure 5:
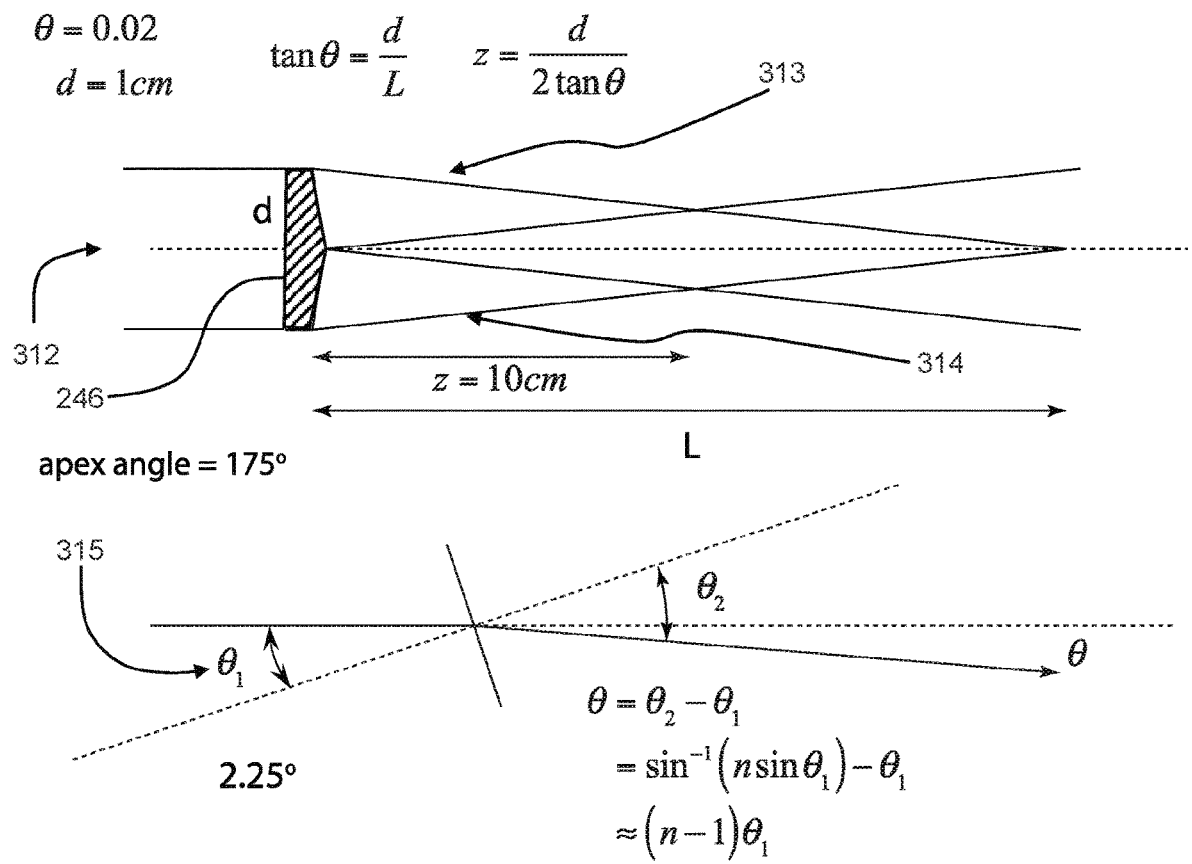
FIG. 5 is a depiction of deflection calculations caused by refraction for a Fresnel biprism used in embodiments of the present disclosure.

FIG. 5 depicts optical properties of a Fresnel biprism used in embodiments of the present disclosure (for example, Fresnel biprism 246). An incident collimated laser beam 312 is split into two collimated beams 313 and 314 that cross at a crossing angle θ. In the overlap region L between the two beams there are interference fringes with a fringe spacing A given by $$\Lambda = \frac{\lambda}{2\sin\theta}$$

where λ is the wavelength of the light source. For digital holography, the fringe spacing A should obey the "Rule-of-Nine" for which there are at least three camera pixels per fringe and at least three fringes per speckle. Current digital cameras have a typical pixel size of 5 microns resulting in a fringe spacing of 15 microns and yielding a design angle θ<0.028. Half of the apex angle of a Fresnel biprism is angle 315 ($\theta_1$). The relationship between θ and $\theta_1$ is:

$$\theta_1 = \frac{\theta}{n-1}.$$

For a refractive index of n=1.55, the apex angle is $2\theta_1=175°$.

A desired crossing angle for digital holography used in embodiments of the present disclosure is θ=0.02 rad, which is achieved with a Fresnel apex angle of 175°.

Figure 6:
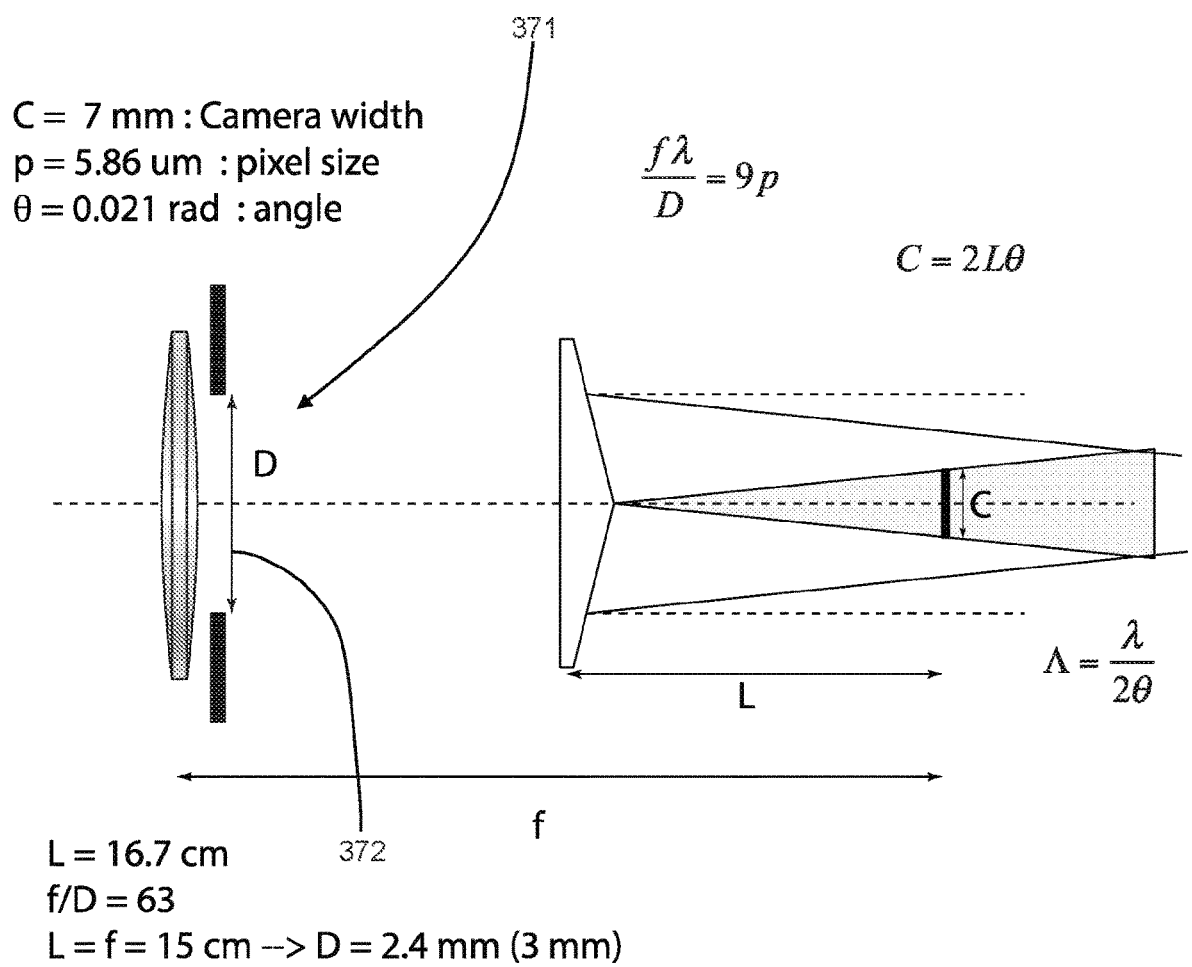
FIG. 6 is a depiction of relationships among the f/# of the lens and the camera size (chip size) for embodiments of the present disclosure.

FIG. 6 depicts relationships between the size of the camera chip and the distance to the apertured lens. It is desirable to fill the aperture 371 of the imaging device (for example, a camera) with interference fringes to capture both the maximum number of photons and to fully modulate the data with interference fringes. A nominal configuration that works with the digital holography of embodiments of the present disclosure gives L=f=15 cm. Furthermore, an aperture diameter 372 (D) of 3 millimeters should also achieve the optimal speckle size.

Figure 7:
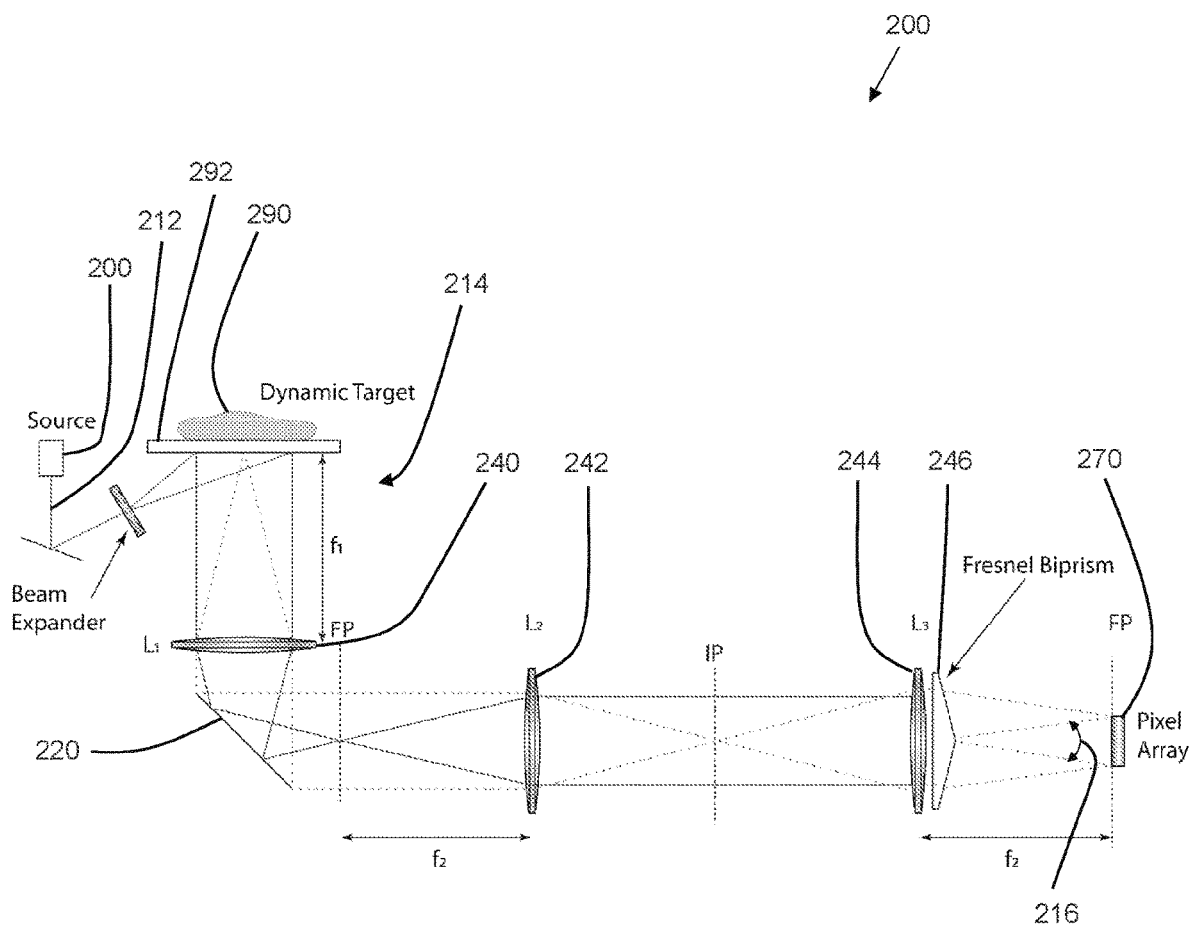
FIG. 7 is a schematic diagram of a digital holography system according to at least one additional embodiment of the present disclosure.

FIG. 7 depicts a Fourier-domain Fresnel biprism biodynamic imaging system 200 (which may also be referred to as a Fresnel biprism tissue dynamics spectroscopy system) according to embodiments of the present disclosure. The illumination source 210 can be either a low-coherence source (for example, a superluminescent diode) or a high-coherence source (for example, a laser). Some embodiments utilize an illumination source 210 that is red in color or is in the invisible near infrared portion of the electromagnetic spectrum. The illumination source 210 illuminates a dynamic (living) target 290. The target illumination may be in an inverted microscope configuration where the beam 212 is incident from below a transparent slide 292 supporting the target 290. The target illumination may also utilize a beam expander 219, which can assist in targeting the whole of the sample and can also assist with enhancing the diffuse scattering of the light. The backscattered light 212 may be collected by lens 240 (L1) that projects the information onto a Fourier plane FP. The lens 240 (L1) may be positioned a focal length f1 from the target. A mirror 220 may be used to redirect the light in some embodiments. A second lens 242 (L2) (for example, a Fourier-transform lens) can be used to image the intermediate Fourier plane onto an intermediate image plane IP, and may be placed a focal length f2 from the Fourier plane FP downstream of the lens L1. A third lens 244 (L3) (which may also be a Fourier-transform lens) can transform the light signal onto an image device 270 on a final Fourier plane, which may be a pixel array chip such as a CCD camera chip or a CMOS camera chip. The light after lens 244 (L3) may be intercepted by an optical element 246 (which may be a Fresnel biprism) that creates two halves of the light path that cross at the crossing angle 216 from FIG. 5. The overlapping beams downstream of the lens 246 produce interference fringes that modulate the speckle pattern on the image detector 270. The surface of the image detector 270 (which may be a pixel array) is located at the Fourier plane of the imaging system. The image can be reconstructed by performing a digital Fourier transform of the data from the camera. The fringes produce two coherent side bands that represent the coherence section of the target. The use of the Fresnel biprism immediately after the Fourier-transform lens is contrary to common knowledge in digital holographic imaging in which image fidelity is a desired feature of an imaging apparatus. The placement of the Fresnel biprism in the current embodiment creates an autocorrelation map of the target after reconstruction rather than a one-to-one image. For normal imaging this would be undesirable, but for biodynamic imaging and tissue dynamics spectroscopy, this embodiment produces high sensitivity to internal cell motions while providing exceptional stability for low-noise measurements even in vibrating environments.

The imaging system 200 is valuable for imaging thin samples or for imaging thick samples when depth information is not as desired. However, many applications use dynamic targets that are spatially heterogeneous and key information is carried by the depth information. To extract depth information, the imaging system 200 depicted in FIG. 7 can be modified to the imaging system 300 configuration depicted in FIG. 8. by introducing a delay plate 380 on half of the Fresnel biprism 246. In some embodiments the delay plate 380 is an optical flat, while in other embodiments the delay plate 380 is a polarization rotator. Embodiments utilizing a low-coherence source 200, for example, a superluminescent diode, can be selective on depth, in other words, allow a user to interpret the results at different depths.

In embodiments of imaging system 300 where the delay plate 380 is an optical flat, two virtual images 391 that partially overlap are produced. The offset between the two virtual images 391 is governed by the thickness of the optical flat and the offset can be determined as being equal to (n−1)d, where n is the refractive index of the optical flat and d is the thickness of the optical flat. When the light source has low coherence, the interference fringes emanate from the overlap region.

In some embodiments, two optical plates are used and there is a slight thickness difference Δd that may be adjusted to produce a net differential delay of (n−1)Δd, resulting in the net delay being adjustable between 100 microns and 300 microns. The interference fringes will occur for photons scattered from the overlap region between the two virtual images, which selectively locates the photons from a reduced depth range.

Figure 8:
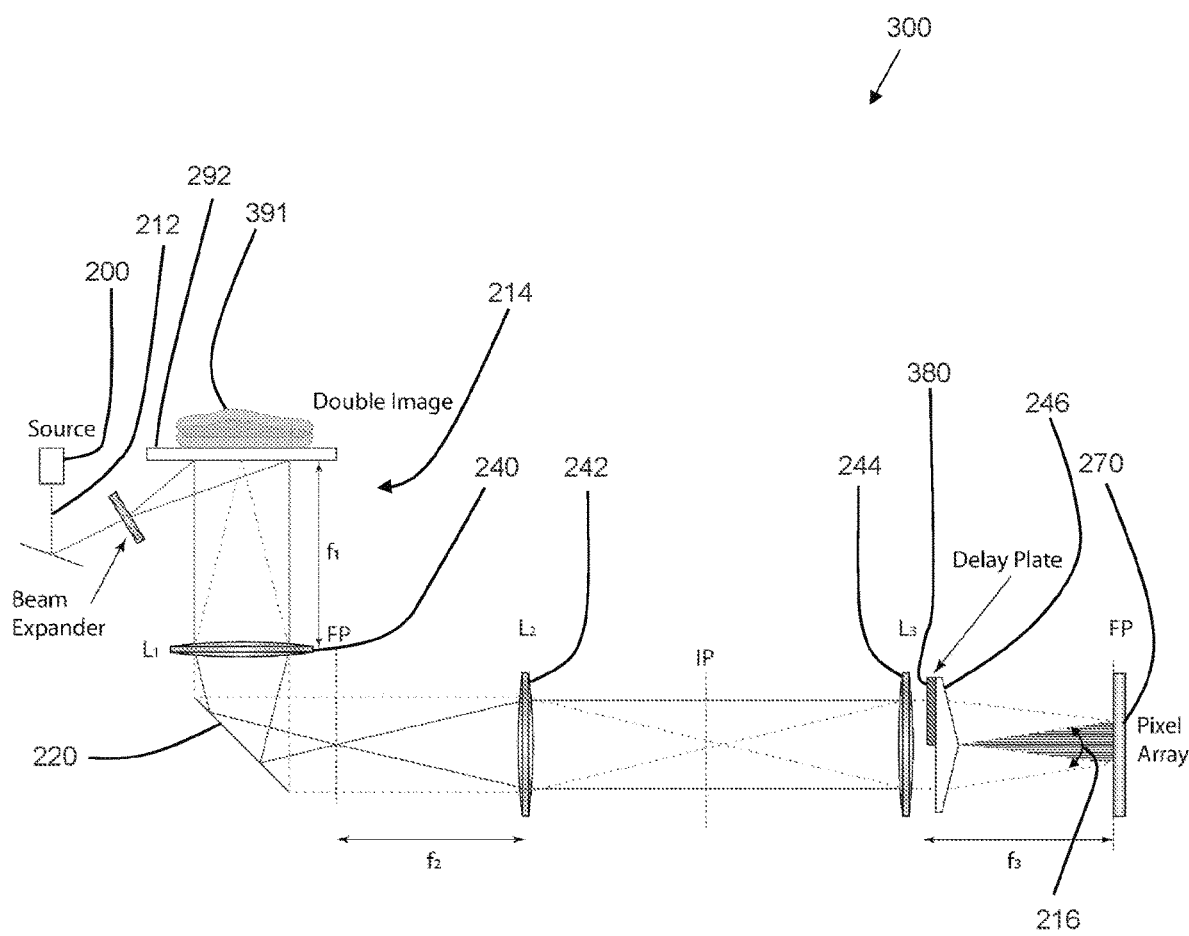
FIG. 8 is a schematic diagram of a digital holography system according to at least a further embodiment of the present disclosure.

In embodiments of FIG. 8 where the delay plate 380 is a polarization rotator, multiple scattering events from deeper within the target can produce at least some photons with orthogonal polarization when the target sample (for example, a dynamic target sample) is volumetric and highly scattering, as when the target sample is a tissue biopsy or a tissue structure grown in a bioreactor. Therefore, by rotating the polarization by ninety degrees at the Fresnel biprism, these embodiments produce interference fringes when deeper photons interfere with shallow photons. This effectively creates the same double image of virtual images with interference fringes coming only from the overlap region. As such, these embodiments can not only work with a short-coherence light source, but can also work with a long-coherence light source since, for example, it is interfering photons that have been multiply scattered and hence have longer path lengths that might be outside the coherence length of a low-coherence light source. As such, these embodiments allow use of a long-coherence light source while still providing partial depth selection. This is contrary to conventional wisdom since crossed polarization is well known to not produce interference fringes and depth selection is known to be only obtained from low-coherence sources. Advantages that may be realized when using embodiments with long-coherence light sources is that the long-coherence light sources tend to be less expensive and of higher intensity than short coherence sources, making interrogation of translucent samples (samples that reflect only a small amount of light) easier. It is worth noting that it is also possible to use this configuration with a short-coherence source because of the volumetric scattering from the sample that occurs, enhancing the depth selectivity.

Elements depicted in FIGS. 7 and 8 with reference numerals similar to (e.g., with two digits the same) or the same as those depicted in FIG. 1 can function similar to (or the same as), be manufactured in a similar (or identical) manner, and have characteristics (and optional characteristics) similar to (or the same as) the elements in the other figures unless described as being incapable of having those functions or characteristics, or unless a person of ordinary skill in the art would recognize the elements as being incapable of having those functions or characteristics.

Various Aspects of Different Embodiments of the Present Disclosure are Expressed in Paragraphs X1, X2, X3, X4 and X5 as Follows:

X1. In accordance with a one aspect of embodiments of the present disclosure, an apparatus for imaging a target sample is disclosed, the apparatus comprising: a target sample support configured and adapted to support a target sample; a light source configured and adapted to produce light; means for diffusely scattering the light produced by the light source off the target sample; means for producing two crossing beams from the light after the light has been diffusely scattered off the target sample, said means for producing two crossing beams focusing the light at a detection plane; and an imaging device positioned at the detection plane, the imaging device configured and adapted to create an image from the light received by the imaging device.

X2. In accordance with a another aspect of embodiments of the present disclosure, a method for imaging a tissue sample is disclosed, the method comprising: generating light; directing the light toward a tissue sample; reflecting the light off the tissue sample; generating two beams from the light reflected off the tissue sample; crossing the beams at an imaging device; and generating information related to the cell motility of the tissue sample.

X3. In accordance with a still another aspect of embodiments of the present disclosure, an apparatus is disclosed, the apparatus comprising: a light source producing light; a target sample support configured and adapted to support a target sample and positioned where a target sample held by the support receives and reflects light from the light source; a Fourier lens positioned to receive the light reflected from the target sample and transform the light passing through the Fourier lens; a Fresnel biprism positioned to receive the transformed light emerging from the Fourier lens; and an imaging device positioned to receive the light emerging from the Fresnel prism.

X4. In accordance with a yet another aspect of embodiments of the present disclosure, a cell motility imaging apparatus for imaging a tissue sample is disclosed, the imaging apparatus comprising: an illumination source providing an illumination beam; a tissue sample support configured to support a tissue sample in a location where the illumination beam is incident on the tissue sample and scatters off of the tissue sample, the scattered beam forming an object beam; a wavefront splitting element positioned to collect the object beam after it has been scattered by the tissue sample and split the object beam into a signal beam and a reference beam; and a detector positioned to detect the signal beam and the reference beam.

X5. In accordance with a another aspect of embodiments of the present disclosure a motility imaging apparatus for imaging a tissue sample is disclosed, the imaging apparatus comprising: an illumination source providing an illumination beam; a tissue sample support configured to support a tissue sample in a location where the illumination beam is incident on the tissue sample and scatters off of the tissue sample; a Fresnel biprism positioned in the pathway of the illumination beam after scattering off the tissue sample; and a detector positioned to detect the illumination beam after passing through the Fresnel biprism.

Yet other embodiments include the features described in any of the previous statements X1, X2, X3, X4 or X5, as combined with
  (i) one or more of the previous statements X1, X2, X3, X4 or X5,
  (ii) one or more of the following aspects, or
  (iii) one or more of the previous statements X1, X2, X3, X4 or X5 and one or more of the following aspects:

Wherein said means for producing two crossing beams includes a Fourier lens and a Fresnel biprism.

Wherein said means for producing two crossing beams includes a beam splitting diffraction grating, a spatial filter and a Fourier lens.

Wherein the spatial filter includes two apertures of different sizes.

Wherein the target sample support is configured and adapted to support a live tissue sample.

Wherein the target sample support is transparent, and said means for diffusely scattering includes illuminating the target sample through the target sample support and illuminating the target sample support at an oblique angle relative to the backscatter direction.

Wherein said scattering means includes a beam expander.

Wherein the light source is a short-coherence light source.

Wherein the light source is a long-coherence light source.

Wherein a polarization rotator is placed in the pathway of one of the crossing beams.

Wherein reflecting the light includes diffusely scattering the light off the tissue sample.

Wherein generating two crossing beams includes passing the light through a Fourier lens and a Fresnel biprism.

Wherein directing the light includes passing the light through a beam expander prior to said reflecting the light off the tissue sample.

Wherein generating two crossing beams includes passing the light through a beam splitter, a spatial filter and a Fourier lens.

Wherein generating two crossing beams includes passing the light through two apertures of different sizes.

Immobilizing the sample tissue using surface bonding chemistry so that mechanical motions of the sample do not affect said generating information and said surface bonding chemistry is non-toxic to the health of the tissue.

Supporting the tissue sample using a transparent support.

Directing the light through the support prior to the light reaching the tissue sample.

Directing the light toward the tissue sample at an oblique angle relative to the transparent support.

Wherein generating light includes generating long-coherence light.

Wherein generating light includes generating short-coherence light.

Rotating the polarization of one of the crossing beams after said generating two beams.

Wherein the wavefront splitting element includes a diffraction grating.

Wherein the wavefront splitting element includes a double-aperture opaque screen located on the image plane.

Wherein the illumination source is a low-coherence source.

Wherein the illumination source is a high-coherence source.

A delay plate positioned on one of the apertures in the opaque screen.

Wherein after the wavefront splitting element the reference beam is intercepted by an opaque plane containing an aperture.

Wherein the aperture is positioned at the location of a bright speckle.

Wherein the aperture is of variable size.

Wherein a Fourier-transform lens is placed after the wavefront splitting element.

Wherein the detector is located at the Fourier plane.

Wherein the crossing angle between the signal beam and the reference beam at the detector providing a carrier frequency for digital holography.

Wherein the wavefront splitting element is a Fresnel biprism.

A beam expander positioned to expand the illumination beam before the illumination beam is incident on the tissue sample.

Wherein the tissue sample support is configured to support the tissue sample in a location where the full portion of the of the illumination beam is incident on the tissue sample.

A polarization rotator placed in one of either the signal beam or the reference beam.

A delay plate situated on one half of the Fresnel biprism.

A polarization rotator placed on one half of the Fresnel biprism.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

To clarify the use of and to hereby provide notice to the public, the phrases "at least one of A, B, . . . and N" or "at least one of A, B, N, or combinations thereof" or "A, B, . . . and/or N" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

Element Numbering

Table 1 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

TABLE 1

| | |
|---|---|
| 100 | interferometer |
| 110 | light source |
| 112 | probe beam |
| 120 | mirror |
| 124 | backscatter direction |
| 126 | wave vector |
| 130 | objective lens |
| 140 | lens |
| 142 | lens |
| 144 | lens |
| 146 | lens |
| 150 | diffraction grating |
| 160 | spatial filter |
| 162 | reference aperture |
| 164 | object aperture |
| 162 | small reference aperture |
| 164 | large object aperture |
| 170 | imaging device |
| 190 | target |
| f1 | focal length 1 of FIG. 1 |
| f2 | focal length 2 of FIG. 1 |
| FP1 | Fourier Plane 1 |
| FP2 | Fourier Plane 2 |
| IP1 | image plane 1 |
| IP2 | image plane 2 |
| 200 | imaging system |
| 210 | illumination source |
| 212 | beam |
| 214 | backscattered light |
| 216 | crossing angle |
| 219 | beam expander |
| 220 | mirror |
| 240 | lens |
| 242 | lens |
| 244 | lens |
| 246 | lens |
| 270 | imaging device |
| 290 | target |
| 292 | slide |
| f1 | focal length 1 of FIGS. 7 & 8 |
| f2 | focal length 2 of FIGS. 7 & 8 |
| FP | Fourier Plane |
| IP | image plane |
| 312 | laser beam |
| 313 | crossing beam |
| 314 | crossing beam |
| 315 | angle |
| 371 | aperture |
| 380 | delay plate |
| 391 | virtual images of target |

What is claimed is:

1. An apparatus for imaging a target sample, comprising:
a target sample support configured and adapted to support a target sample;
a light source configured and adapted to produce light;
means for diffusely scattering the light produced by the light source off the target sample;
means for producing two crossing beams from the light after the light has been diffusely scattered off the target sample, said means for producing two crossing beams focusing the light at a detection plane; and
an imaging device positioned at the detection plane, the imaging device configured and adapted to create an image from the light received by the imaging device.

2. The apparatus of claim 1, wherein said means for producing two crossing beams includes a Fourier lens and a Fresnel biprism.

3. The apparatus of claim 1, wherein said means for producing two crossing beams includes a beam splitting diffraction grating, a spatial filter and a Fourier lens.

4. The apparatus of claim 3, wherein the spatial filter includes two apertures of different sizes.

5. The apparatus of claim 1, wherein the target sample support is configured and adapted to support a live tissue sample.

6. The apparatus of claim 1, wherein the target sample support is transparent, and said means for diffusely scattering includes illuminating the target sample through the target sample support and illuminating the target sample support at an oblique angle relative to the backscatter direction.

7. The apparatus of claim 1, wherein said scattering means includes a beam expander.

8. The apparatus of claim 1, wherein the light source is a short-coherence light source.

9. The apparatus of claim 1, wherein the light source is a long-coherence light source.

10. The apparatus of claim 9, wherein a polarization rotater is placed in the pathway of one of the crossing beams.

11. The apparatus of claim 1, wherein:
said means for producing two crossing beams includes a Fourier lens and a Fresnel biprism;
the target sample support is transparent and configured and adapted to support a live tissue sample, and said means for diffusely scattering includes illuminating the target sample through the target sample support and illuminating the target sample support at an oblique angle relative to the backscatter direction; and
said scattering means includes a beam expander.

12. The apparatus of claim 11, wherein the light source is a long-coherence light source.

13. The apparatus of claim 12, wherein a polarization rotater is placed in the pathway of one of the crossing beams.

14. The apparatus of claim 1, wherein:
said means for producing two crossing beams includes a beam splitting diffraction grating, a spatial filter defining two apertures of different sizes, and a Fourier lens;
the target sample support is transparent and configured and adapted to support a live tissue sample, and said means for diffusely scattering includes illuminating the target sample through the target sample support and illuminating the target sample support at an oblique angle relative to the backscatter direction; and
the light source is a short-coherence light source.

15. A method for imaging a tissue sample, comprising:
generating light;
directing the light toward a tissue sample;
reflecting the light off the tissue sample;
generating two beams from the light reflected off the tissue sample;
crossing the beams at an imaging device; and
generating information related to the cell motility of the tissue sample.

16. The method of claim 15, wherein said reflecting the light includes diffusely scattering the light off the tissue sample.

17. The method of claim 15, wherein said generating two crossing beams includes passing the light through a Fourier lens and a Fresnel biprism.

18. The method of claim 17, wherein said directing the light includes passing the light through a beam expander prior to said reflecting the light off the tissue sample.

19. The method of claim 18, wherein said generating two crossing beams includes passing the light through two apertures of different sizes.

20. The method of claim 15, wherein said generating two crossing beams includes passing the light through a beam splitter, a spatial filter and a Fourier lens.

21. The method of claim 15, further comprising:
immobilizing the sample tissue using surface bonding chemistry so that mechanical motions of the sample do not affect said generating information and said surface bonding chemistry is non-toxic to the health of the tissue.

22. The method of claim 15, wherein said directing the light includes:
supporting the tissue sample using a transparent support;
directing the light through the support prior to the light reaching the tissue sample; and
directing the light toward the tissue sample at an oblique angle relative to the transparent support.

23. The method of claim 15, wherein said generating light includes generating long-coherence light.

24. The method of claim 23, further comprising:
rotating the polarization of one of the crossing beams after said generating two beams.

25. The method of claim 15, wherein said generating light includes generating short-coherence light.

26. The method of claim 15, wherein:
said reflecting the light includes diffusely scattering the light off the tissue sample;
said generating two crossing beams includes passing the light through a Fourier lens and a Fresnel biprism; and
said directing the light includes:
supporting the tissue sample using a transparent support,
directing the light through the support prior to the light reaching the tissue sample, and
directing the light toward the tissue sample at an oblique angle relative to the transparent support.

27. The method of claim 26, wherein
said directing the light includes passing the light through a beam expander prior to said reflecting the light off the tissue sample; and
said generating light includes generating long-coherence light.

28. The method of claim 15, wherein:
said reflecting the light includes diffusely scattering the light off the tissue sample;
said generating two crossing beams includes passing the light through a beam splitter, a spatial filter defining two differently sized apertures, and a Fourier lens;
said directing the light includes:
supporting the tissue sample using a transparent support;
directing the light through the support prior to the light reaching the tissue sample; and
directing the light toward the tissue sample at an oblique angle relative to the transparent support; and
said generating light includes generating short-coherence light.

* * * * *